Figure 1:
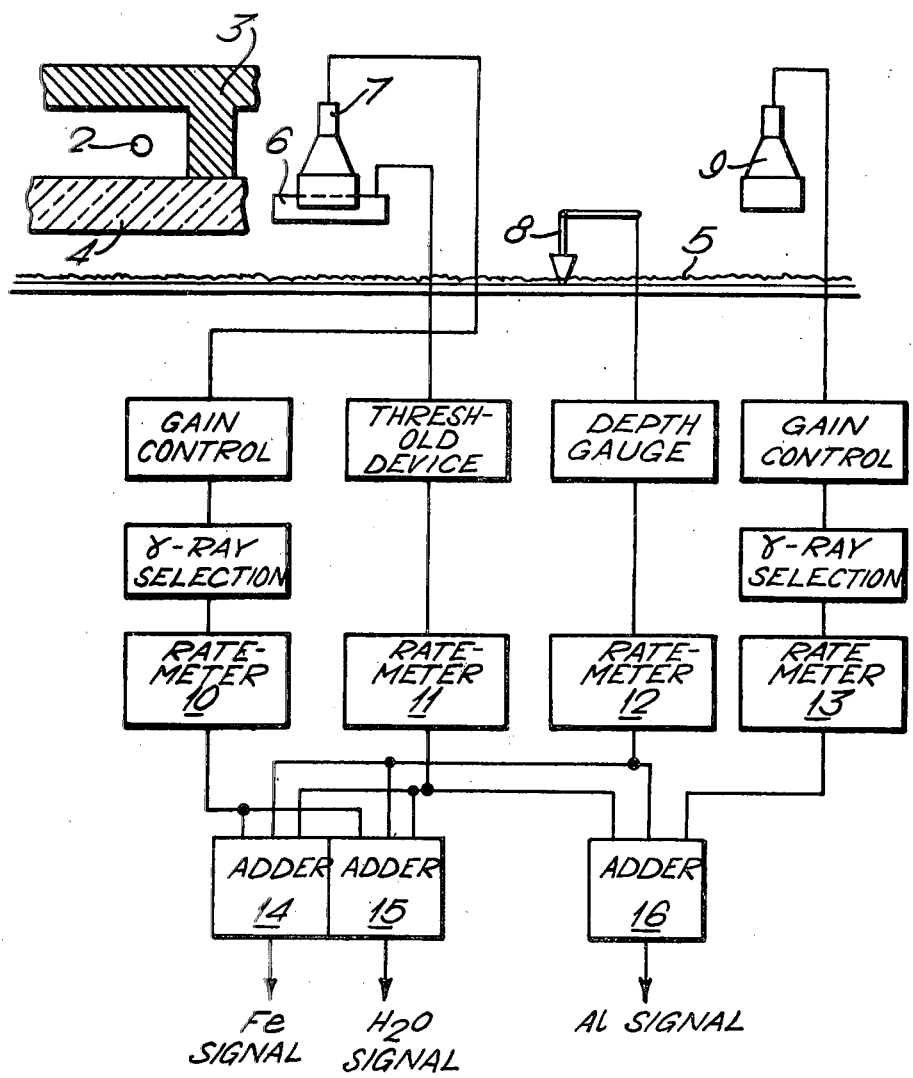

United States Patent [19]
Holmes et al.

[11] 3,889,112
[45] June 10, 1975

[54] METHOD AND APPARATUS FOR MEASURING THE CONCENTRATION OF WATER, IRON AND ALUMINUM IN IRON ORE BY NEUTRON RADIATION

[75] Inventors: Ralph John Holmes, South Yarra, New South Wales; Alan Wilson Wylie, Nunawading, New South Wales; Kenneth Gordon McCracken, Roseville, New South Wales, all of Australia

[73] Assignee: Commonwealth Scientific and Industrial Research Organization, Campbell, Australian Capital Territory, Australia

[22] Filed: June 11, 1973

[21] Appl. No.: 368,785

[30] Foreign Application Priority Data
June 9, 1972  Australia.............................. 9294/72

[52] U.S. Cl................................. 250/265; 250/270
[51] Int. Cl............................................... G01t 1/16
[58] Field of Search ............ 250/253, 265, 269, 270

[56] References Cited
UNITED STATES PATENTS
3,139,528  1/1964  Johnson.............................. 250/270
3,420,998  1/1969  Mills, Sr.......................... 250/265 X

*Primary Examiner*—James W. Lawrence
*Assistant Examiner*—Davis L. Willis
*Attorney, Agent, or Firm*—Sughrue, Rothwell, Mion, Zinn and Macpeak

[57] ABSTRACT

Techniques and apparatus for measuring the concentration of water and specific components in materials are described. The techniques involve irradiating the material with neutrons and monitoring the neutron flux in th vicinity of the irradiated material and the gamma radiation from excited nuclei of the specific component. Examples of the use of the invention include on-stream monitoring of ores carried by conveyor belts and borehole logging using a probe which carries a neutron source, and neutron and gamma radiation detectors.

18 Claims, 3 Drawing Figures

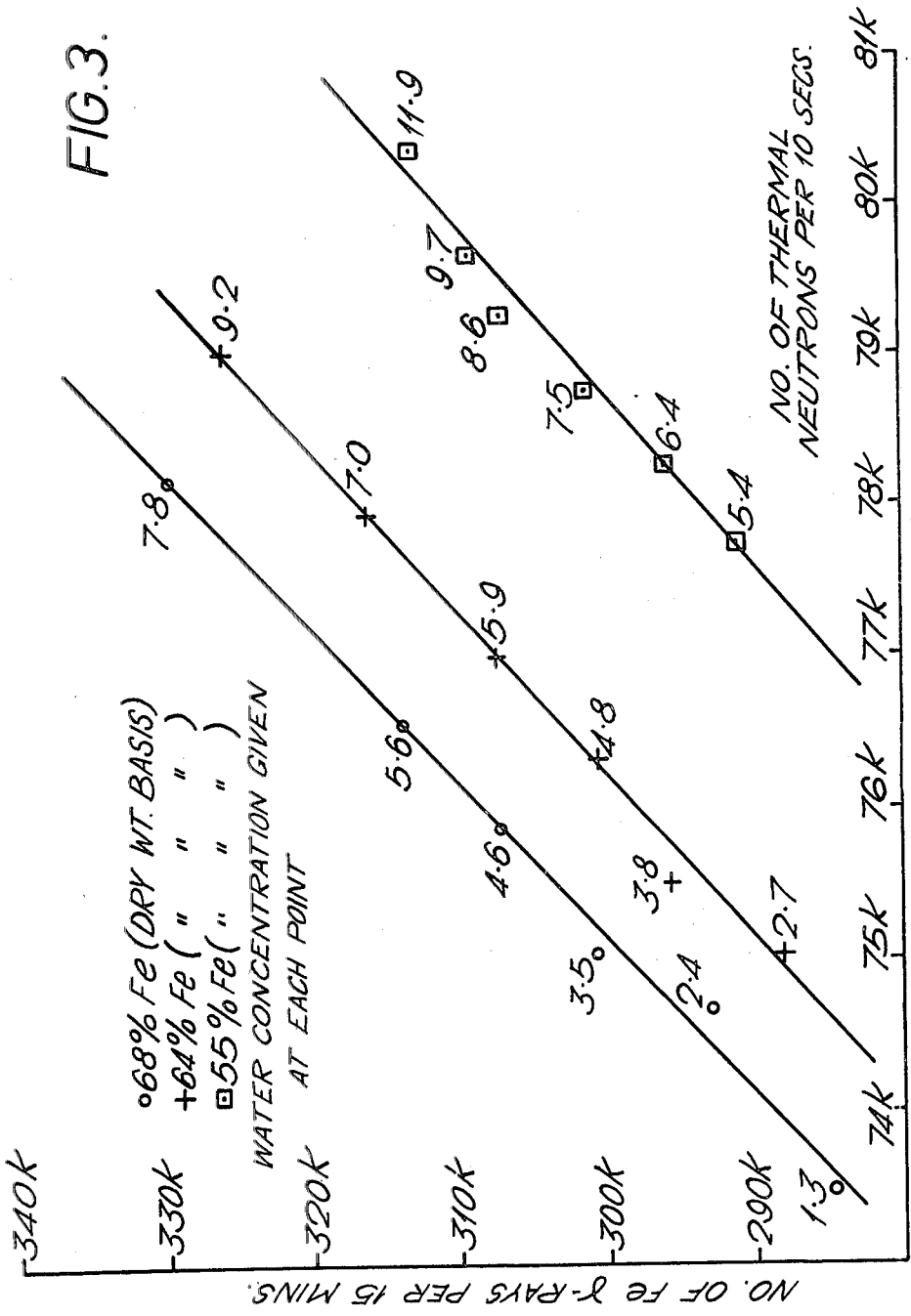

METHOD AND APPARATUS FOR MEASURING THE CONCENTRATION OF WATER, IRON AND ALUMINUM IN IRON ORE BY NEUTRON RADIATION

This invention concerns the analysis of material using a neutron irradiation technique to determine the quantities of specific components (metallic or nonmetallic) in a material by measuring the gamma rays emitted and neutrons scattered by that material when irradiated with neutrons.

The present invention is applicable to many situations. Two specific (but non-limiting) uses will be discussed in this specification. One is its applicability to the monitoring of ore quality for sorting into stockpiles or in blending to establish a required ore quality. The other is a down-hole technique for evaluating the ore penetrated by a borehole.

A particular example of the first use of the present invention is in the loading of iron ore into a ship for export. Here it is essential that the ore grade satisfies the specification in the contract governing the exportation. One of the current procedures for monitoring the ore being loaded involves the periodic sampling of a small quantity (a few kilograms) of the ore from the loading conveyor, followed by an x-ray fluorescence or other examination of the sample. In another arrangement large scale sampling plants are used to obtain samples of the ore before loading onto a ship is started. These samples are also subjected to x-ray fluorescence or other examination.

In the x-ray fluorescence technique, the sampled ore is ground, then a few grams are compressed or fused to form a spectrometric sample. If the examination shows that the ore is of inferior quality, the feed to the ship's hold is interrupted or another supply of ore is sampled, as the case may be. However, the result of the examination is not available immediately and if, in the case of on-stream sampling, the variation in ore quality is not sufficiently short-term that its effect on the shipment as a whole is unimportant, a considerable quantity of inferior ore can be loaded into a hold before its poor quality is noted.

A similar sort of problem besets the man who wishes to sort his ores into piles of similar qualities because chemical engineers treating ores prefer the ore they handle to be of a uniform quality, rather than simply of a minimum acceptable grade. An ore which is too rich in a specific component requires an adjustment of the treatment plant conditions. An over-rich ore also represents an economic loss to the supplier, who can use the present invention, incorporating a number of monitoring positions, to control a blending of low grade (and possibly otherwise useless) ore with the over-rich ore to produce ore of a (uniform) acceptable quality.

An on-stream x-ray fluorescence technique is not applicable to a moving stream of coarse solids, for although it is effective when measuring slurries or constant-geometry flows, it is not suitable for lump-flow measurement, where the path length of the x-rays is constantly changing, and the measurement does not extend to material more than 1 mm below the surface of the lumps. Even if this technique could be used, only the upper surface of the ore would be monitored, which is not a representative sample of the bulk ore for, as is well-known, the vibration of a conveyor belt causes preferential enrichment of the lower layers by mechanical differentiation.

It is one of the objectives of the present invention to provide a technique and apparatus for rapid measurement of the quality of ore or similar bulk material, whether it is a stationary sample (above ground or down a borehole) or moving on a conveyor, the measurement providing an average value of the concentration of both a specific component and the water content of the bulk material.

Briefly, this is effected by irradiating the material with neutrons and monitoring both the gamma rays emitted and the moderated neutron flux. In the case of iron ore sampling, it is known that the gamma radiation from a constant moisture content ore which has been bombarded with neutrons is dependent on its iron content. It is also known that, if other constituents are constant in value, a variation in water content of neutron-irradiated ore will produce a change in the thermal neutron population within the ore. As-mined iron ores, however, have neither a constant water content nor a constant iron content and the variation of each component has an affect on the parameter indicative of the concentration of the other component. Consequently, bombardment with neutrons and measurement of either parameter alone will not give a meaningful result for analysis purposes. When the ore is on a conveyor belt, there is an added complication in that the number of gamma rays and thermal neutrons may also depend on the depth or weight of ore and hence one of these quantities must also be measured.

As far as we can ascertain, no-one has previously determined the inter-relationship of iron (and other metals) and water insofar as their concentrations affect the populations of gamma rays and thermal neutrons from neutron-irradiated ore. The specification of U.S. Pat. No. 3,146,349 to E. D. Jordan describes a luggage examination arrangement where thermal neutrons irradiate luggage and the gamma rays and neutrons from the luggage are monitored, but Jordan's technique is aimed at determining the presence of a boron-containing additive to explosive material which, if present, would show up by the production of 0.477 MeV gamma rays and a decrease in neutron flux. He indicates that either gamma ray or neutron monitoring alone is sufficient and the double measurement would merely confirm a neutron-boron reaction. The present invention, however, requires both measurements to be made and, as will be shown, relies on the mutual variation of the parameters with variation of ore quality. Moreover, the Jordan technique is qualitative while the present invention provides a quantitative measurement of water and a specific component of a substance.

Several specific components may be present in a material, for example, iron and aluminium in an iron ore. An extension of the present invention permits the measurement of the concentration of water and a plurality of specific components.

According to the present invention, a method of measuring the concentration of water and a specific component of a material comprises irradiating the material with neutrons, measuring both the number of neutrons per unit time in the region of the irradiated material and the number of gamma rays characteristic of the specific component emitted per unit time from the material, and correllating the measured neutrons and gamma rays with known values for specific component/water concentrations.

The material may be an ore, and the neutrons irradiating the material may be slow (for example, when detecting the presence of iron or aluminium), medium or fast (for example, when investigating silicon). The neutron flux should be measured at the point of irradiation but the gamma rays may be measured at any appropriate time within the half-life of the specific component nucleus which has been excited to an unstable state. The measurement may be of a stationary or a moving material, but when the invention is applied to a conveyor belt situation, it is also necessary to measure the depth or weight of the material on the belt, and to use this measurement in determining the concentrations sought.

The invention further comprises the additional step of measuring the differences of the rate of neutron and gamma ray emission from the material from pre-set values and feeding the differences into two programmed calculators to obtain signals indicative of the difference in water and specific component of the ore from pre-set values.

Also according to the present invention, an apparatus for measuring the concentration of water and a specific component of a material comprises a source of neutrons for irradiating the material, a neutron detector located to monitor the neutron population in the vicinity of the irradiated material at the point and time of irradiation, and a gamma ray detector, the signal from which is arranged to indicate only the number of gamma rays received which have a particular energy value or range, both detectors being connected to respective counting circuits.

If the measurement is to be effected on a conveyor belt system, apparatus for measuring the depth or weight of the ore on the belt must also be included, the signal indicative of this parameter being connected to a third counting circuit.

The gamma ray detector may be arranged to look at the irradiated ore at the point of irradiation or at any time within the half-life of the excited nucleus of the irradiated specific component. The counting circuits may be connected to programmed analogue adders or their equivalents in digital equipment to obtain signals indicative of the actual percentage of water and specific component in the material.

Both the method and apparatus of the present invention encompass the use or inclusion of a plurality of gamma ray detectors arranged to look at the irradiated material at or subsequent to the irradiation thereof, whereby the concentration of a plurality of specific components in a material can be determined.

Figure 2:
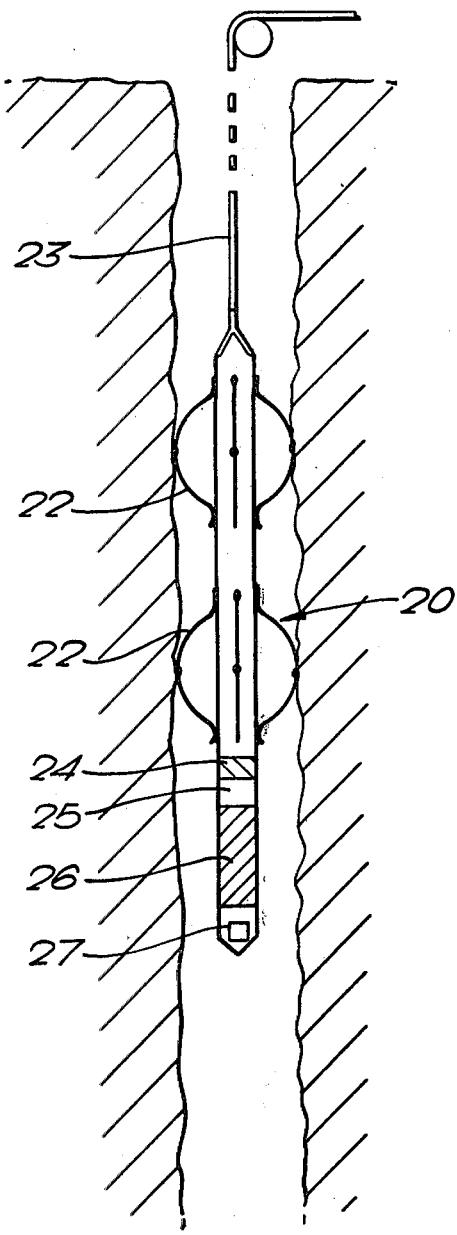

Two embodiments of the present invention will now be described, by way of example only, with reference to the accompanying drawings, in which:

FIG. 1 illustrates a conveyor belt monitoring arrangement and associated circuits, FIG. 2 shows the component arrangement for a borehole monitoring device, and FIG. 3 is a graphical indication of the variation of neutron and gamma ray counting rates with water and iron content of a constant mass of iron ore for one particular ore and monitoring equipment geometry.

Referring to FIG. 1, a suitable neutron source 2, located above (as illustrated) or below a conveyor belt 5, is enclosed in a chamber constructed of, except for the side facing the conveyor, material 3 which is substantially opaque to neutrons and gamma rays. If slow neutrons are to irradiate the material on the conveyor belt, the side of the chamber facing the conveyor is closed by a neutron moderating material 4. In this way, the only neutrons leaving the chamber have thermal or epithermal energies and are directed towards the conveyor. The thermal neutrons are incident on the belt 5 and interact with any material, e.g. iron ore, being carried by the conveyor. The reaction with the iron in the ore produces a characteristic gamma ray emission which is detected by gamma ray detector 7. The water in the iron ore further moderates and absorbs the neutron population and thus alters the flux of the iron gamma rays. The change in neutron population is measured by a neutron detector 6 mounted adjacent to the ore and the gamma ray detector. A moving arm, or other suitable device 8 is responsive to changes in depth of the material on the belt and produces an analogue signal indicative of material depth. The neutron detector 6 and gamma radiation detector 7 are normally shielded from neutrons and gamma radiation which could travel direct from the neutron source to the detectors.

The gamma ray detector has a response which is a known function of the gamma ray energy. The signal from the gamma ray detector is processed to select those signals due to iron alone — in this case, all gamma rays of energy between about 6 MeV and 9 MeV. These signals are fed to a ratemeter 10, the output of which is a known function of the flux of iron gamma rays.

The signals from the neutron detector are processed to select those due to neutrons alone and these are fed to a ratemeter 11, the output of which is a known function of the flux of the neutrons. The signal from the depth gauge is fed to ratemeter 12.

The ratemeter outputs are electrical analogues of the gamma ray counting rates and neutron counting rates, and using two analogue summers 14, 15 appropriately programmed, the changes in iron and total water content of the ore from pre-determined values can be obtained. In more detail, if the iron and total water contents of the ore change by $\Delta F$ and $\Delta H$ respectively, and the depth (or weight) of the ore changes by $\Delta D$, then the neutron and gamma ray count rates change by $\Delta n$ and $\Delta \phi$ in accordance with the relationships $$\Delta n = \frac{\delta n}{\delta F} \cdot \Delta F + \frac{\delta n}{\delta H} \cdot \Delta H + \frac{\delta n}{\delta D} \cdot \Delta D \qquad (i)$$

$$\Delta \phi = \frac{\delta \phi}{\delta F} \cdot \Delta F + \frac{\delta \phi}{\delta H} \cdot \Delta H + \frac{\delta \phi}{\delta D} \cdot \Delta D \qquad (ii)$$

The partial derivatives in these equations are not necessarily constant. For example, $\delta\phi/\delta H$ and $\delta\phi/\delta D$ may be functions of the iron content of the ore.

Equations (i) and (ii) can be re-written as:

$$\Delta F = A.\Delta n + B.\Delta \phi + C.\Delta D \qquad (iii)$$
$$\text{and} \quad \Delta H = E.\Delta n + G.\Delta \phi + L.\Delta D \qquad (iv)$$

where
$$A = + \frac{1}{s} \cdot \frac{\delta \phi}{\delta H}$$
$$B = - \frac{1}{s} \cdot \frac{\delta n}{\delta H}$$
$$C = - \frac{1}{s} \left[ \frac{n}{\delta D} \cdot \frac{\delta \phi}{\delta H} - \frac{\delta \phi}{\delta D} \cdot \frac{\delta n}{\delta H} \right]$$

-Continued $$E = -\frac{1}{s} \cdot \frac{\delta\phi}{\delta F}$$

$$G = +\frac{1}{s} \cdot \frac{\delta n}{\delta F}$$

$$L = -\frac{1}{s} \left[ \frac{\delta\phi}{\delta D} \cdot \frac{\delta n}{\delta F} - \frac{\delta n}{\delta D} \cdot \frac{\delta\phi}{\delta F} \right]$$

where $s = \frac{\delta n}{\delta F} \cdot \frac{\delta\phi}{\delta H} - \frac{\delta\phi}{\delta F} \cdot \frac{\delta n}{\delta H}$ The electrical outputs from the three ratemeters provide the quantities $\Delta\phi$, $\Delta n$ and $\Delta D$, and the analogue summers 14, 15 are programmed in accordance with Equations (iii) and (iv).

Although ratemeters and analogue adders have been referred to in the description of this embodiment of the invention, it will be clear to those skilled in the electronic counting art that alternative digital equipment can be used. For example, a multi-channel analyser or digital counter can be substituted for the ratemeters with a digital calculator taking the place of the adders.

We have ascertained that for a particular geometry of detectors, neutron source and constant mass of iron ore, the output from detectors 6 and 7 is related to the percentage of iron and total water in the ores substantially as indicated in FIG. 3. Thus knowledge of the gamma ray and neutron counting rates at constant ore mass will pin-point the ore on FIG. 3. When the depth (or mass) varies, it is difficult to draw a diagram and equations (i) and (ii) must be used. With this knowledge, it is possible to determine what variation of signals is permissible while the ore remains within acceptable limits of iron content. Thus the output from the analogue adders (or digital calculator) can be used to automatically control the ore flow so that only ore of a required quality is passed to a given destination (e.g., the hold of a ship). Alternatively, or in addition, the values of the different concentrations can be displayed and/or recorded for monitoring and/or record purposes.

In practice, the geometry of the system should be optimised for the required application. That is, the relative positions of the source and detector with reference to each other and to the sample under analysis should be chosen to achieve maximum linearity of response or maximum sensitivity, whichever is required.

It should be noted that it is important to determine the change in numbers of both the gamma rays and neutrons from the ore as well as the change in depth or mass of the ore. For example, a drop in number of gamma rays of energy between about 6.0 MeV and 9.0 MeV at constant mass from, say 310,000 per 15 minutes to 300,000 per 15 minutes, while monitoring initially an ore of 64 percent by weight iron and 6.0 percent by weight water, could indicate a change to 64% iron and 4.8% water, 68% iron and 3.5% water, or 55% iron and 7.0% water. In this particular case, a 1 percent change in water affects the gamma ray counting rate by the same amount as a change in iron concentration of about 4 percent.

In a similar manner, the aluminium content of the iron ore can be ascertained by recording and processing the rate of emission of aluminium gamma rays and thermal neutrons. The latter have to be measured at the moment of irradiation, but the former — in the energy range 1.6 to 2.0 MeV — can be measured up to 1 minute downstream of the irradiation point as the activated aluminium nucleus has a half-life of 2.3 minutes. An additional gamma ray recorder 9 (FIG. 1) may therefore be located down-belt of the neutron source and its signal processed to select those signals due to the characteristic aluminium gamma rays alone. The signals are then (taking the analogue circuitry case) fed into a ratemeter 13 which provides an electrical analogue of the change in the aluminium gamma ray flux, $\Delta\alpha$. This analogue is combined in an analogue summer 16 as described previously to yield an electrical analogue of the change '$\Delta Al$' in aluminium grade from its reference value, in accordance with the equation $$\Delta Al = X.\Delta n + Y.\Delta\alpha + Z.\Delta D \qquad (v)$$

where $X = +\frac{1}{T} \cdot \frac{\delta\alpha}{\delta H}$ $Y = -\frac{1}{T} \cdot \frac{\delta n}{\delta H}$ $Z = -\frac{1}{T} \left[ \frac{\delta n}{\delta D} \cdot \frac{\delta k}{\delta H} - \frac{\delta\alpha}{\delta D} \cdot \frac{\delta n}{\delta H} \right]$ where $T = \frac{\delta n}{\delta N} \cdot \frac{\delta\alpha}{\delta H} - \frac{\delta\alpha}{\delta Al} \cdot \frac{\delta n}{\delta H}$ (As indicated earlier, the partial derivatives may not be constant in value.) Thus the monitoring and control of the ore can be effected with respect to iron, water and aluminium content.

It will be clear to those skilled in this art that appropriate selection of gamma rays for investigation will enable other ores and materials to be monitored in a similar manner.

Important features of this technique are that the evaluation of ore is substantially immediate, and that while the measurement must depend on the grade and depth of the ore, the moderator controlling the neutron emission from the source, and the geometry of the detecting arrangement, for the illustrated arrangement with an iron ore depth of about 15 cm (within which a large fraction of the neutrons are captured), the measurement is representative of a major portion of the ore passing the sampling point and is relatively unaffected by substantial variations in size and shape of the lumps of ore and mechanical differentiation that invariably occurs on a moving belt.

A limitation of the above conveyor belt system, which will be apparent to those skilled in the art, is that in the case of downstream monitoring (for example, of aluminium), it is necessary to re-calibrate the system in the event that the belt speed is changed. In most commercial installations, however, the belt speed remains substantially constant at all times.

It will also be apparent that, when choosing a specific component in a material for investigation, it is preferable to select components having a fairly rapid decay when activated. This is partly because rapidly decaying compounds are relatively quickly activated when irradiated with neutrons, and partly because, with a shorter half-life, there is more activity to monitor. In practice, the example of aluminium, which has a half-life of about 2.3 minutes, represents about the useful limit of this technique. It is difficult to measure accurately the concentration of components with substantially longer decay half-lives.

It should also be noted that it is important to consider the nature of the material being investigated when selecting a neutron source for its irradiation. For example, when the presence of aluminium is being investigated, a californium source of neutrons is preferred because with higher energy neutron sources (for example, a plutonium/beryllium source) there is the possibility of the production of aluminium-28 from silicon in accordance with the reaction $$Si^{28} (n,p) Al^{28}.$$

This reaction starts with neutrons of energy about 4 MeV. Within this restriction, any suitable neutron source may be used, including accelerator sources and pulsed sources, both of which are available commercially.

If other variables such as ore density and combined (as opposed to total) moisture content become important (for example, in applications where a greater degree of precision is required), appropriate measurements must be made to include their effect. This may be done by using a normal gamma ray back-scattering technique and by measurement of the epithermal neutron flux in addition to the thermal neutron flux. Additional terms must then be added to the equations (i) and (ii), as indicated below for the borehole logging case.

If the technique of the present invention is to be used in borehole logging, the down-hole probe of FIG. 2 may be used. This probe has a body portion 20 to which spring members 22 may be mounted to locate the probe substantially centrally within the borehole. (This is preferable for small diameter boreholes but may not be suitable for large diameter boreholes.) The major (and uppermost, when the probe is located within a borehole) part of the body portion 20 carries the electronic circuitry for processing the information derived from the gamma radiation detector 24 and neutron detector 25. This circuitry includes the counting circuits and (if required) the analogue adders, or digital calculator arranged in the same manner as the corresponding components of the embodiment illustrated in FIG. 1. As before, the gamma and neutron detectors are separated from the neutron source 27 by a suitable shield 26 of such a composition as to minimise interference (i.e. which does not produce interfering gamma radiation).

As with the conveyor belt system, the geometry of the probe should be optimised to achieve the desired response for a given position of the probe in the borehole. This applies particularly to the choice of distances between the source and detector.

In interpreting the signals from a down-hole probe of this type, it is often desirable to know the density of the rock through which the borehole passes. This density is usually monitored separately using known techniques, such as a gamma-radiation back-scattering technique. As all probe responses vary to a greater or lesser extent with borehole diameter, it is essential to know this diameter. This necessitates an independent calipering measurement unless automatic correction equipment is included in the probe.

In use, the probe is lowered down the borehole at a uniform rate and the neutron flux and gamma radiation from the bore walls are monitored continuously. Alternatively, fluxes can be monitored at selected depths, with no movement of the probe. In all cases, care must be taken to ensure that all signals emanate from the same level of the borehole.

Conceptually, the conveyor belt system described above is approximately equivalent to a borehole cut in half along its axis. The formulae from which the concentration of specific components in the rock alongside the borehole can be determined are thus similar to those for the conveyor belt situation, but with a term included for changes in radius $R$ of the borehole and rock (bulk) density $P$. For example, equations (i) and (ii) become:

$$\Delta n = \frac{\delta n}{\delta F} i\Delta F + \frac{\delta n}{\delta H}.\Delta H + \frac{\delta n}{\delta P} + \frac{\delta n}{\delta R}.\Delta R \quad (vi)$$

$$\text{and} \quad \Delta\phi = \frac{\delta\phi}{\delta F}.\Delta F + \frac{\delta\phi}{\delta H}.\Delta H + \frac{\delta\phi}{\delta P}.\Delta P + \frac{\delta\phi}{\delta R}.\Delta R \quad (vii)$$

The remainder of the calculations follow as before. If water is present in the borehole, a new set of coefficients A, B, C, D, . . . must be determined for the wet section of the hole.

We claim:
1. A method of quantative measurement of the concentration of water and a specific component in a material comprising the steps of
   i. irradiating the material with neutrons,
   ii. measuring the neutron flux in the region of the irradiated material,
   iii. measuring the number of gamma rays characteristic of the specific component emitted per unit time from the material,
   iv. measuring the differences between
      a. the measured neutron flux and number of gamma rays and
      b. known values of these parameters obtained from samples of the material having known concentrations of water and the specific component, and
   v. from the difference measurements, determining the concentration of water and the specific component in the material being examined.

2. A method as claimed in claim 1, in which the material is iron ore, the specific component is iron, the neutrons irradiating the material are slow neutrons, and the measurement of gamma radiation is effected at substantially the time of irradiation.

3. A method as claimed in claim 1, in which the specific component is aluminium, the neutrons irradiating the material are slow neutrons, and the measurement of gamma radiation is effected within about the half-life of the excited aluminium nucleus produced by the irradiation of the material.

4. A method as claimed in claim 3, in which the material which is irradiated is iron ore.

5. A method as claimed in claim 1, in which the number of gamma rays characteristic of at least one further specific component of the material emitted per unit time from the material is measured and correlated with known values of the number of gamma rays characteristic of the further specific component or components obtained from samples of the material having known concentrations of the further specific component or components to determine the concentration of the further specific component or components in the material being examined.

6. A method as claimed in claim 5, in which the material is iron ore, and gamma rays characteristic of iron and aluminium are measured, the measurement of the gamma radiation characteristic of aluminium being effected within about the half-life of an excited aluminium nucleus.

7. A method as claimed in claim 1 in which the material is being transported on a conveyor belt at the time of measurement.

8. A method as claimed in claim 7, including the additional step of measuring the depth or weight of the material on the conveyor belt and using the measured value of depth or weight so obtained to modify the correlation of measured parameters with known values of those parameters obtained for samples of the material having known specific component and water concentrations.

9. A method as claimed in claim 8, in which the measured values of water and specific component concentrations are utilised to control the distribution of the material from the conveyor belt.

10. A method as claimed in claim 1, in which the material is the rock in the immediate vicinity of a borehole.

11. A method as claimed in claim 10, including, in addition, measurement of the density of the rock in the immediate vicinity of the borehole and measurement of the diameter of the borehole, and using the additional measurement to modify the correlation of measured parameters with known values of those parameters obtained from samples of the material having known specific component and water concentrations.

12. Apparatus for quantitative measurement of the concentration of water and a specific component in a material comprising:
   i. a source of neutrons for irradiating the material,
   ii. a neutron detector positioned to monitor the neutron population in the vicinity of the irradiated material at the time of irradiation thereof,
   iii. a gamma ray detector designed to produce an output signal indicative of the number of gamma rays received from the irradiated material which have an energy within a predetermined energy range characteristic of the decay of an excited nucleus of the specific component, and
   iv. counting circuits to which the outputs of said detectors are respectively connected, the outputs from which are fed to calculating devices which are programmed to measure the differences between (a) the measured neutron flux and number of gamma rays and (b) known values of these parameters obtained from samples of the material having known concentrations of water and the specific component and, from the difference measurements to determine the concentration of water and the specific component in the material being examined.

13. Apparatus as claimed in claim 12, including a second gamma ray detector designed to produce an output signal indicative of the number of gamma rays received from the irradiated material which have an energy within a predetermined energy range characteristic of the decay of an excited nucleus of a second specific component of the material, the output of the second gamma ray detector being connected to a respective counting circuit, the output of which is fed, together with the output of the counting device associated with the neutron detector, to a further calculating device programmed to correlate the outputs fed thereto with known values of the number of gamma rays characteristic of the second specific component obtained from samples of the material having known concentrations of the second specific component.

14. apparatus as claimed in claim 12, in which the material is located on a conveyor belt which moves past the detectors, said apparatus including means to measure the depth of mass of material which is being irradiated, said depth or mass measuring means providing a signal which is fed to each calculating device for use in the determination of the concentration of water and specific component.

15. Apparatus as claimed in claim 12, in which the material is located on a conveyor belt which moves past the detectors, the neutron source produces slow neutrons, the material is iron ore, the first and second specific components are iron and aluminum, respectively, and the second gamma ray detector is located downstream of the point of irradiation of the material a distance corresponding to the distance moved by the material in about the half-life of an excited aluminium nucleus.

16. Apparatus as claimed in claim 12, in which the material is the rock in the immediate vicinity of a borehole and the apparatus is mounted on a borehole probe.

17. Apparatus as claimed in any one of claim 12, in which the counting circuits are ratemeters and the calculating devices are analogue adders.

18. Apparatus as claimed in any one of claim 12, in which the counting circuits are channels in a multichannel analyser or digital counters, and the calculating devices are digital.

* * * * *

UNITED STATES PATENT OFFICE
CERTIFICATE OF CORRECTION

PATENT NO. : 3,889,112
DATED : June 10, 1975
INVENTOR(S) : Ralph John HOLMES et al It is certified that error appears in the above-identified patent and that said Letters Patent are hereby corrected as shown below:

IN THE HEADING:

Kindly delete the present designation of Inventors, and insert the following description:

--Inventors: Ralph John Holmes, South Yarra, Victoria, Australia,
Alan Wilson Wylie, Nunawading, Victoria, Australia,
Kenneth Gordon McCracken, Roseville, New South Wales, Australia --.

Signed and Sealed this twenty-eight Day of October 1975

[SEAL]

Attest:

RUTH C. MASON
*Attesting Officer*

C. MARSHALL DANN
*Commissioner of Patents and Trademarks*